United States Patent
Shiohara

(10) Patent No.: US 9,137,442 B2
(45) Date of Patent: Sep. 15, 2015

(54) IMAGE-DISPLAYING DEVICE FOR DISPLAYING INDEX INDICATING DELAY IN TIMING BETWEEN IMAGE CAPTURE AND DISPLAY

(75) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 188 days.

(21) Appl. No.: 13/152,443

(22) Filed: Jun. 3, 2011

(65) Prior Publication Data

US 2011/0298962 A1     Dec. 8, 2011

(30) Foreign Application Priority Data

Jun. 4, 2010    (JP) ................................. 2010-128613

(51) Int. Cl.
     *H04N 5/232*       (2006.01)

(52) U.S. Cl.
     CPC ....... *H04N 5/23293* (2013.01); *H04N 5/23235* (2013.01); *H04N 5/23241* (2013.01)

(58) Field of Classification Search
     CPC ......... H04N 1/212; H04N 1/215; H04N 1/21; H04N 1/2104; H04N 1/2112; H04N 1/0048; H04N 1/00416; H04N 1/2125; H04N 5/23245; H04N 5/23241; H04N 5/23235; H04N 5/23293; H04N 5/23232; H04N 7/0127; H04N 7/013; G06F 3/005
     USPC ........................................ 348/333.02, 333.04
     See application file for complete search history.

(56) References Cited

U.S. PATENT DOCUMENTS

| | | | |
|---|---|---|---|
| 7,710,468 B2 | 5/2010 | Uchida et al. | |
| 7,948,526 B2* | 5/2011 | Onoda et al. | 348/222.1 |
| 2006/0114334 A1* | 6/2006 | Watanabe et al. | 348/222.1 |
| 2006/0237626 A1* | 10/2006 | Sakai et al. | 250/208.1 |
| 2007/0211153 A1* | 9/2007 | Uchida et al. | 348/231.99 |
| 2008/0055318 A1* | 3/2008 | Glen | 345/501 |
| 2008/0129854 A1* | 6/2008 | Onoda et al. | 348/295 |
| 2008/0151070 A1* | 6/2008 | Shiozawa et al. | 348/222.1 |
| 2008/0186399 A1* | 8/2008 | Okamoto | 348/372 |
| 2009/0167890 A1* | 7/2009 | Nakagomi et al. | 348/222.1 |
| 2010/0194880 A1* | 8/2010 | Furutani et al. | 348/135 |
| 2011/0157376 A1* | 6/2011 | Lyu et al. | 348/207.11 |

FOREIGN PATENT DOCUMENTS

JP      2007-243615 A      9/2007

* cited by examiner

*Primary Examiner* — Pritham Prabhakher
(74) *Attorney, Agent, or Firm* — Global IP Counselors, LLP

(57) ABSTRACT

An image-displaying device includes a display control section and an index display control section. The display control section is configured to display in a display section an image of a subject based on image data indicative of the image of the subject generated based on output data from an image-capturing section that captures the image of the subject. The index display control section is configured to display in an index display section an index corresponding to a delay between a timing corresponding to image-capture of the subject by the image-capturing section and a timing corresponding to display of the image of the subject by the display section.

8 Claims, 8 Drawing Sheets

IMAGE-DISPLAYING DEVICE FOR DISPLAYING INDEX INDICATING DELAY IN TIMING BETWEEN IMAGE CAPTURE AND DISPLAY

CROSS-REFERENCE TO RELATED APPLICATIONS

This application claims priority to Japanese Patent Application No. 2010-128613 filed on Jun. 4, 2010. The entire disclosure of Japanese Patent Application No. 2010-128613 is hereby incorporated herein by reference.

BACKGROUND

1. Technical Field

The present invention relates to an image-displaying device for displaying an image of a subject in a display section, and to a display control circuit.

2. Related Art

Conventional image-capturing devices are known in which an image captured by an image-capturing sensor is displayed by a liquid crystal display, and various techniques have been developed for preventing a delayed display of the image of the subject from occurring in the liquid crystal display. In Japanese Laid-Open Patent Application Publication No. 2007-243615, for example, a technique is disclosed whereby an image signal is read and displayed by a liquid crystal display before writing of the image signal of a single frame to the VRAM is completed in an image-capturing device provided with a VRAM for recording an image signal of a single frame. Specifically, a configuration is described in which image display by a liquid crystal display is started at a playback timing that is delayed by ΔT from the drive timing of the image-capturing sensor.

SUMMARY

In a configuration whereby an image of a subject captured by an image-capturing sensor is displayed in a display section of an image-capturing device so as to enable the user to confirm the subject prior to its capture, if the image of the subject is displayed at a delay from the subject, deviation may arise between the image of the subject at timing coincident with shutter release and the actual condition of the subject. For this reason, the delay as mentioned above may pose an impediment to capturing an image in the manner intended by the user. However, in the technique disclosed in Japanese Laid-Open Patent Application Publication No. 2007-243615, the user cannot ascertain the condition of the delay in question, and neither the picture composition nor the release timing can be determined in consideration of the delay. Specifically, in the technique disclosed in this publication, for each mode, e.g., normal image capture mode, digital zoom mode, and so on, a phase difference ΔT is determined, and subsequent to capturing of the image by the image-capturing sensor, reproduction is initiated at a timing delayed by a different phase difference ΔT for each mode. However, these different quantities of delay for each of the modes are not noticeable to the user.

The present invention was developed in view of the foregoing problems, and an object of the present invention is to make it possible for the user to ascertain the extent of delay in the display section.

In order to achieve the objects described above, a configuration is adopted in accordance with one aspect of the present invention whereby an index corresponding to delay between timing corresponding to image-capture of a subject by an image-capturing section and timing corresponding to display of an image of the subject by a display section is displayed on an index display section. In other words, in a configuration wherein an image of a subject is able to be displayed on a display section through generation of image data from output data of the image-capturing section, it is not possible for an image of the subject to be displayed instantaneously on the display section subsequent to image capture of the subject. Specifically, output data that entails a prescribed required period from the start of image capture in the image-capturing section is output, and once the output data is output, a further image data generation process that entails a prescribed required period is carried out, and it is possible for an image of the subject to be displayed on the display section only after the generation process in question has ended. Consequently, a delay is introduced between timing corresponding with image capture of the subject by the image-capturing section and timing corresponding to display of the image of the subject by the display section. Here, by displaying on the index display section an index which corresponds to the delay in question, it is possible for a user observing the index in question to ascertain the extent of the delay shown on the display section. Optionally, this delay duration may be acquired through measurement of the duration from timing corresponding with image capture of the subject by the image-capturing section to timing corresponding to display of the image of the subject by the display section, and an index in accordance with the measured duration may be displayed.

Optionally, the display control section may display an image of the subject on the display section based on image data. Typically, an image of the subject is captured by an area sensor and output data is generated for each line, whereby display of each line of the display section can be carried out based on image data of each line which has been generated from the output data of each line.

Optionally, the index display control section produces a display of the index on the index display section. Here, the index may be information that corresponds to the delay between timing corresponding with image capture of the subject and timing corresponding to display of the image of the subject by the display section, the information making the delay in question directly or indirectly noticeable to the user. As the former, there can be cited, for example, information that indicates the duration of the delay between timing coincident with the start of image capture of the subject by the image-capturing section, and timing coincident with initiation of display of an image of the subject on the display section. As shall be apparent, it is sufficient for the index to correspond to a delay, and various other delays may be contemplated, such as the delay between the start of image capture and the start of display, or the delay between completion of image capture and completion of display.

As the latter, there can be cited, for example, information that indicates the current aforementioned frame rate in the display section. Specifically, in instances where it is possible to display images of a subject at different frame rates in the display section, the likelihood of a shorter delay quantity is higher at faster frame rates. Here, if information indicating the frame rate is displayed as the aforementioned index, it will be possible for the user to ascertain the extent of the delay in the display section. Of course, the index is not limited to a numerical value indicating the magnitude of the delay or the frame rate, and may instead be information that indicates the magnitude of the delay or the frame rate by an icon representing the quantity thereof, such as a color, a graphic, a symbol, or the like.

The index display section may be provided to the image-capturing device as a section that displays the index, and may be configured as part of the display section for displaying the image of the subject, or as any display device different from the display section. As shall be apparent, display devices may be any of various classes of displays such as liquid crystal displays, or LEDs or the like.

As a further preferred configuration example for displaying on the index display section an index that corresponds to the delay between timing corresponding with image capture of a subject and timing corresponding to display of an image of a subject by the display section, there may be employed a configuration in which the working of the image-capturing device is modified through an operation by the user, and an index corresponding to the modified working condition is displayed. For example, in a configuration in which the quantity of images displayed per unit time in the display section is modified in response to a user operation of an operating section that is provided to the image-capturing device, there may be employed a configuration in which an index corresponding to the quantity of images which are displayed per unit time subsequent to a modification is displayed by the index display section.

Specifically, modification of the quantity of images which are displayed per unit time in the display section refers to modification of the update frequency of the display section, the modification in question resulting in fluctuation of the delay between timing corresponding with image capture of a subject and timing corresponding to display of an image of a subject by the display section. Here, by displaying an index corresponding to the quantity of images that are displayed per unit time by way of the index corresponding to the aforementioned delay, it is possible for the user to ascertain fluctuation of the delay resulting from operation of the operating section.

The quantity of images which are displayed per unit time refers to the number of lines or number of frames with which the display content is updatable in the display section in prescribed unit time. For example, in a configuration in which single frame display and single line display timing in the display section are controlled by a vertical synchronization signal and a horizontal synchronization signal, if the vertical synchronization period or the horizontal synchronization period is modified, the number of lines or number of frames of the subject displayed by the display section per unit time will change. Here, in a configuration in which the vertical synchronization period or the horizontal synchronization period is modifiable in response to user operation of the operating section, there may be employed a configuration for displaying an index that changes in association with a modification of the vertical synchronization period or the horizontal synchronization period in question. For example, by adopting a configuration whereby, in the event that the quantity of images displayed per unit time is a first quantity, the index display section is caused to display an index indicating a greater delay that in the event that the quantity of images displayed per unit time is a second quantity greater than the first quantity, it will be possible for the user observing the index to ascertain the extent of the delay in the display section.

It is sufficient for the operating section to be one adapted for utilization for the purpose of executing various functions in the image-capturing device, and the operating section may be composed, for example, of dials, buttons, or the like. Further, the operating section in question may be one adapted to receive execution instructions for any of various functions. For example, the operating section may be one adapted to modify the quantity of images displayed per unit time, or the operating section may be one may be adapted to execute some other function. As the latter, there may be cited instances in which a function executed as the result of an operating instruction in the operating section has no conceptual correspondence with the index, and instances in which there no one-to-one correspondence between the two.

Specifically, as the former, there may be cited instances in which, owing to the lack of a direct association between a function for carrying out an execution instruction by the operating section and the quantity of images displayed per unit time, a change in the quantity of images displayed per unit time resulting from an operation of the operating section is not self-evident to the user. Further, as the latter, there may be cited instances in which a change in the quantity of images displayed per unit time, which may arise from a combination of modes, e.g., a combination of a sports image capture mode and a power saving mode under circumstances in which a plurality of selections are selected and executed by the operating section, may not be self-evident to the user. By adopting a configuration whereby the index changes in response to an operation of the operating section in such instances, it is possible for the user to be clearly apprised of the extent of delay in the display section.

As a further example of a delay arising between timing corresponding with image capture of a subject by the image-capturing section and timing corresponding to display of an image of the subject by the display section, a delay may arise due to the environment in which an image is captured. Specifically, there may be contemplated for the image-capturing section a configuration whereby an exposure of length corresponding to the quantity of received light is carried out, and output data is output subsequent to carrying out exposure of appropriate duration. In other words, in instances where an exposure of length corresponding to the quantity of received light is carried out in an image-capturing section, the delay between timing corresponding with image capture of a subject by the image-capturing section and timing corresponding to display of an image of the subject by the display section may fluctuate in accordance with the length of the exposure duration. Here, by adopting a configuration in which an index indicating a greater delay is displayed in the case that the duration of the exposure is a first duration than in the case that the duration of the exposure is a second duration shorter than the first duration, it will be possible for the user to be clearly apprised of the extent of delay in the display section, which fluctuates in accordance with the length of the exposure duration. Moreover, various other causes besides the duration of exposure may be contemplated as causes of fluctuation in the delay quantity between image capture of a subject and display of an image of the subject in the display section. For example, in instances where the process of generating image data indicating an image of a subject for display subsequent to image capture by the image-capturing section is composed of a plurality of steps, with the duration required for the process of each of the steps being variable, there may be adopted a configuration whereby the index display section displays an index that indicates a greater delay in association with a longer process duration.

As a further example of a delay arising between timing corresponding with image capture of a subject by the image-capturing section and timing corresponding to display of an image of the subject by the display section, there may be contemplated a configuration in which the quantity of images displayed per unit time in the display section fluctuates in accordance with the remaining amount of electricity of the battery for driving the image-capturing device. Specifically, it is contemplated to execute a power saving mode in the image-capturing device in order to suppress the quantity of consumed electricity in the event that the remaining amount of electricity of the battery is at or below a prescribed benchmark. Further, as one method for reducing the quantity of consumed electricity, there is contemplated a configuration for limiting the quantity of images displayed per unit time in the display section (e.g., by switching to a smaller frame rate in power saving mode than in non-power saving mode) in the event that the remaining amount of electricity of the battery is at or below a prescribed benchmark. In this configuration, by displaying on the index display section an index that corresponds to the remaining amount of electricity of the battery, it is possible for the user to be clearly apprised of the extent of delay in the display section, which fluctuates in accordance with the remaining amount of electricity of the battery. For example, by having the index display section display an index indicating a greater delay in the case that the remaining amount of electricity of the battery is a first amount of electricity in comparison with the case that the remaining amount of electricity of the battery is a second amount of electricity greater than the first amount of electricity, then in the event that the delay duration has varied in association with fluctuation in the quantity of images displayed per unit time in the display section in accordance with the amount of electricity, the user will be able to ascertain the fluctuation.

A method for displaying on an index display section an index that corresponds to a delay between timing corresponding with image capture of a subject by the image-capturing section and timing corresponding to display of an image of the subject by the display section as taught in the present invention may be implemented as a display control circuit, a program, or a method.

A device, display control circuit, program, or method such as described above may be implemented as an independent device or circuit or by utilizing a shared component in a device or circuit having multiple functions, and various types of embodiments are included.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the present invention will be described in the following order: (1) Configuration of the image-capturing device; (2) Control of the horizontal synchronization signal; (2-1) Display of Index; and (3) Other embodiments.

(1) Configuration of Image-Capturing Device

Figure 1:
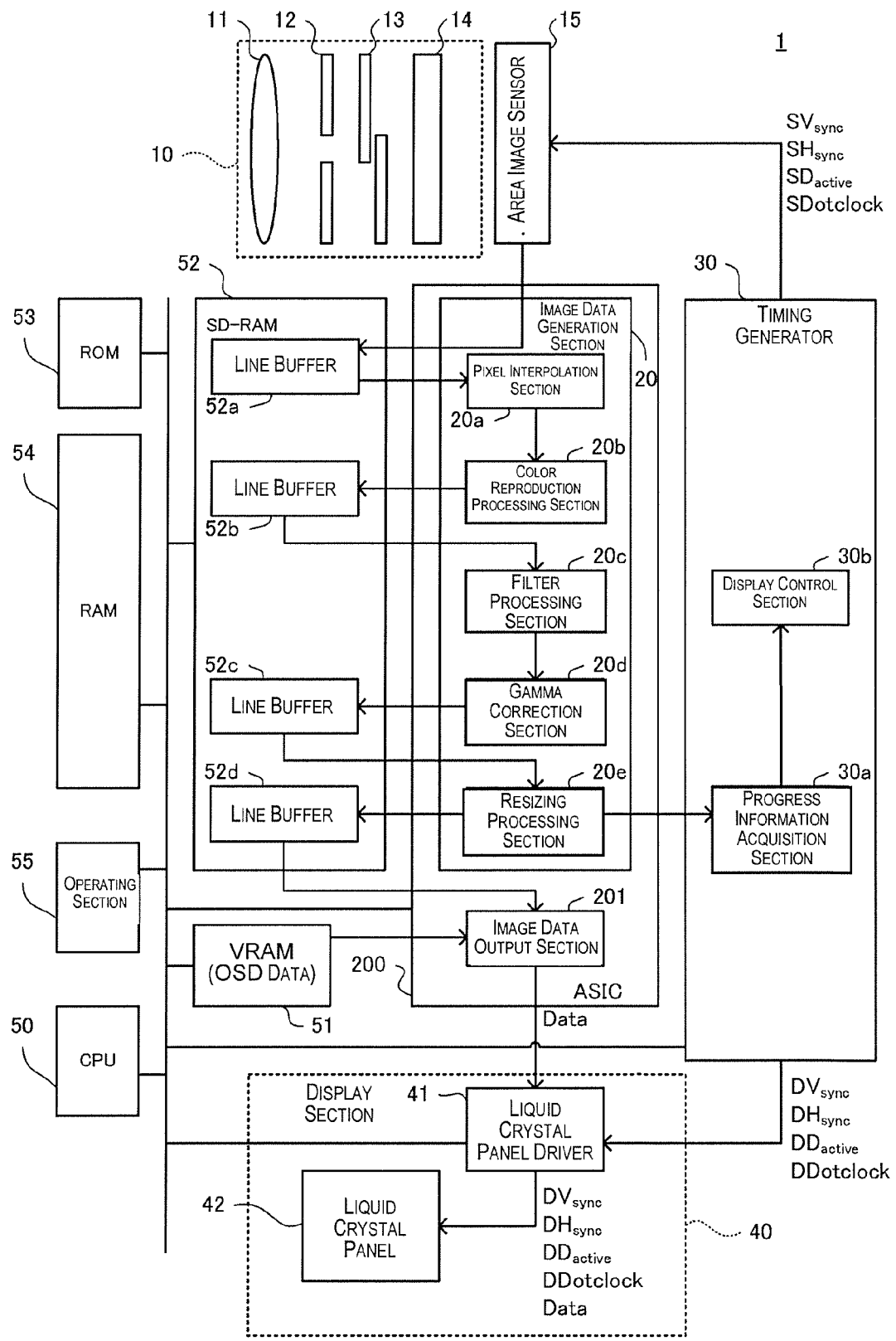
FIG. 1 is a block diagram according to an embodiment of the present invention.

The image-capturing device 1 (image-displaying device) according to an embodiment of the present invention shown in FIG. 1 is provided with an optical system 10, an area image sensor 15 (one example of the image-capturing section), an ASIC 200, a timing generator 30, a display section 40, a CPU 50, a VRAM 51, an SD-RAM 52, a ROM 53, a RAM 54, and an operating section 55. The ASIC 200 may also be an image processing DSP (digital signal processor). The CPU 50 is capable of executing a program recorded in the ROM 53 by appropriately utilizing the VRAM 51, the SD-RAM 52, and the RAM 54, and through this program, the CPU 50 executes a function for generating image data which indicate a subject captured by the area image sensor 15, in accordance with an operation of the operating section 55. The operating section 55 is provided with a shutter button, a dial switch serving as mode switching means for switching between modes, a dial switch for switching aperture and shutter speed, a push button for operating various setting menus, and a selector switch for power modes composed of a power saving mode and a non-power saving mode, enabling the user to input various instructions to the image-capturing device 1 by operation of the operating section 55. The power saving mode is a mode for limiting the quantity of consumed electricity of the battery that drives the image-capturing device 1 to below a prescribed power consumption; and the non-power saving mode is a mode for driving the image-capturing device 1 at a specified power consumption.

The display section 40 is an EVF (electronic view finder) for displaying an image indicating a subject to be captured and allowing the user to comprehend the appearance of the subject prior to the capturing of the image, and image-capturing conditions and other information, and the image-capturing device 1 according to the present embodiment is a mirrorless digital camera provided with an EVF. The display section 40 is provided with an interface circuit not shown in the drawing, a liquid crystal panel driver 41, a liquid crystal panel 42, and an eyepiece lens and other components not shown in the drawing. In the present embodiment, the liquid crystal panel 42 is a high-temperature polysilicon TFT (Thin Film Transistor) provided with three sub-pixels corresponding to three colors of color filters for each pixel, and the positions of the pixels are prescribed by coordinates in an orthogonal coordinate system. A line is composed of a plurality of pixels aligned in the direction parallel to one coordinate axis, and a plurality of lines is aligned in the direction parallel to the other coordinate axis. In the present specification, the direction parallel to the lines is referred to as the horizontal direction, the direction perpendicular to the lines is referred to as the vertical direction, and a single screen composed of all the pixels of the liquid crystal panel 42 is referred to as a single frame.

The liquid crystal panel driver 41 applies a voltage to each sub-pixel and outputs a signal for driving the liquid crystals to the liquid crystal panel 42. The liquid crystal panel 42 is provided with a gate driver and a source driver not shown in the drawing, and performs display by a process whereby the gate driver controls the display timing in each pixel of each line in accordance with the signal outputted from the liquid crystal panel driver 41, and the source driver applies a voltage that corresponds to the image data of each pixel to each pixel of a line designated by the display timing. In other words, the liquid crystal panel driver 41 is configured so as to output various types of signals for performing display in the liquid crystal panel 42, e.g., a vertical synchronization signal (DVsync) for prescribing a period for display of a single frame; a horizontal synchronization signal (DHsync) for prescribing a period for display of a single line; a data active signal (DDactive) for prescribing a period for importing image data within each line; a data clock signal (DDotclock) for prescribing the import timing of image data of each pixel; and image data (Data) of each pixel.

The image-capturing device 1 according to the present embodiment is provided with the timing generator 30, and the vertical synchronization signal DVsync, the horizontal synchronization signal DHsync, the data active signal DDactive, and the data clock signal DDotclock are generated by the timing generator 30.

In other words, the timing generator 30 is provided with a display control section 30b which is provided with a division circuit or the like for generating a signal in which the signal level varies in synchrony with the variation timing of a clock signal having a predetermined cycle outputted from a clock signal generation means. By control of the display control section 30b, the timing generator 30 generates the vertical synchronization signal DVsync, data active signal DDactive, and data clock signal DDotclock in which the signal levels vary at a timing determined in advance. The output timing of the horizontal synchronization signal DHsync is variable in the present embodiment, and the output timing is determined depending on the processing result of a resizing processing section 20e, as described hereinafter.

The liquid crystal panel 42 in the present embodiment is a panel having an XGA-size pixel count provided with 1024 effective pixels in the horizontal direction and 768 effective pixels in the vertical direction, and can display gradations corresponding to the Data in any position by adjusting the content and output timing of the image data Data outputted by the liquid crystal panel driver 41. In the present embodiment, a configuration is adopted in which an image of the subject is displayed based on the output data of the area image sensor 15 in a subject image display region of the liquid crystal panel 42 determined in advance, and characters indicating image-capturing conditions or other information are displayed in an information display region outside the subject image display region. In other words, characters indicating image-capturing conditions or other information are displayed as an OSD (on-screen display) together with the image of the subject in the liquid crystal panel 42. The liquid crystal panel 42 is provided with a large number of pixels in excess of the effective pixels in the horizontal direction and the vertical direction, but in order to simplify the present specification, no description is given of the processing that relates to pixels other than the effective pixels.

The optical system 10 is provided with a lens 11 for forming a subject image on the area image sensor 15, and an aperture 12, a shutter 13, and a low-pass filter 14. Among these components, the lens 11 and the aperture 12 are replaceably attached to a chassis not shown in the drawing. A CMOS (complementary metal oxide semiconductor) image sensor, CCD (charge coupled device) image sensor, or other solid image-capturing element provided with color filters arranged in a Bayer array, and a plurality of photodiodes for accumulating a charge according to a quantity of light by photoelectric conversion for each pixel is used as the area image sensor 15. The positions of the pixels of the area image sensor 15 are prescribed by coordinates in an orthogonal coordinate system, wherein a line is composed of a plurality of pixels aligned in the direction parallel to one coordinate axis, and a plurality of lines is aligned in the direction parallel to the other coordinate axis. In the present specification, the direction parallel to the lines is referred to as the horizontal direction, the direction perpendicular to the lines is referred to as the vertical direction. A single screen composed of all the pixels of the area image sensor 15 is referred to as a single frame.

In the present embodiment, the area image sensor 15 also operates in synchrony with the various types of signals outputted by the timing generator 30. In other words, the timing generator 30 outputs a vertical synchronization signal (SVsync) for prescribing a period for reading the detection results of the photodiodes for a single frame; a horizontal synchronization signal (SHsync) for prescribing a period for reading the detection results of the photodiodes for a single line; and a data clock signal (SDotclock) for prescribing the read timing and the like of image data of each pixel. The area image sensor 15 starts outputting the output data for a single frame in accordance with the vertical synchronization signal SVsync, and sequentially reads output data which indicate the detection results of the photodiodes corresponding to a portion of the pixels of the area image sensor 15 at a timing in accordance with the data clock signal SDotclock within the period prescribed by the horizontal synchronization signal SHsync.

The ASIC 200 is provided with an image data generation section 20 which is composed of a circuit for performing processing whereby line buffers 52a through 52d for a plurality of lines reserved in advance in the SD-RAM 52 are utilized, and image data for displaying an image of the subject in the display section 40 are generated by pipeline processing. The line buffers 52a through 52d for a plurality of lines may also be provided to the image data generation section 20 or another component. The display section 40 displays the subject on the liquid crystal panel 42 based on the generated image data. In other words, the user can confirm the subject while utilizing the display section 40 as an EVF.

According to the present embodiment as described above, both the area image sensor 15 and the display panel 42 are driven by various signals which are output from the timing generator 30, but in the present embodiment, under conditions in which the display section 40 is being used as an EVF, the cycles of the vertical synchronization signals SVsync, DVsync are controlled such that the cycles are identical and constant. In other words, through this configuration there is provided a configuration whereby the display on the liquid crystal panel 42 of the subject captured by the area image sensor 15 is not delayed by the period of a single frame or longer, nor does a display of an image of the subject captured at the same timing remain on the liquid crystal panel 42 for a period of a plurality of frames.

In the present embodiment, the cycles of the vertical synchronization signals SVsync, DVsync are configured to fluctuate in accordance with the power mode. Specifically, in the event that the user has set the power mode to the non-power saving mode by the operating section 55, the CPU 50 specifies the power mode as the non-power saving mode based on the operation instruction to the operating section 55, and outputs to the timing generator 30 information indicating that the power mode is the non-power saving mode. When the information indicating that the power mode is the non-power saving mode is received by the timing generator 30, the timing generator 30 determines the cycles of the vertical synchronization signals SVsync, DVsync such that these are brought to a predetermined first cycle (in the present embodiment, one corresponding to 60 fps), and outputs the vertical synchronization signals SVsync, DVsync.

On the other hand, in the event that the user has set the power mode to the power saving mode by the operating section 55, the CPU 50 specifies the power mode as the power saving mode based on the operation instruction to the operating section 55, and outputs to the timing generator 30 information indicating that the power mode is the power saving mode. When the information indicating that the power mode is the power saving mode is received by the timing generator 30, the timing generator 30 determines the cycles of the vertical synchronization signals SVsync, DVsync such that these are brought to a predetermined second cycle longer than the first cycle (in the present embodiment, one corresponding to 30 fps), and outputs the vertical synchronization signals SVsync, DVsync. Here, the timing generator 30 controls the phase difference of the vertical synchronization signals SVsync, DVsync to a constant one by outputting the vertical synchronization signal DVsync of the display section 40 subsequent to a prescribed period from timing coincident with output of the vertical synchronization signal SVsync of the area image sensor 15.

Furthermore, the image-capturing device 1 executes various functions in response to operations of the operating section 55. In a case in which the user operates the operating section 55 to issue an image capture instruction, in response to the image capture instruction, the area image sensor 15 starts outputting the output data for a single frame in accordance with the vertical synchronization signal SVsync, and sequentially reads the output data which indicate the detection results of the photodiodes corresponding to all of the effective pixels of the area image sensor 15 at a timing in accordance with the data clock signal SDotclock within the period prescribed by the horizontal synchronization signal SHsync. The image data generation section 20 then utilizes the SD-RAM 52 or another component to generate image data in a JPEG format or other format, and the image data are recorded in a removable memory or the like not shown in the drawing. In other words, the user can generate image data for indicating the subject.

(2) Control of Horizontal Synchronization Signal

Figure 2:
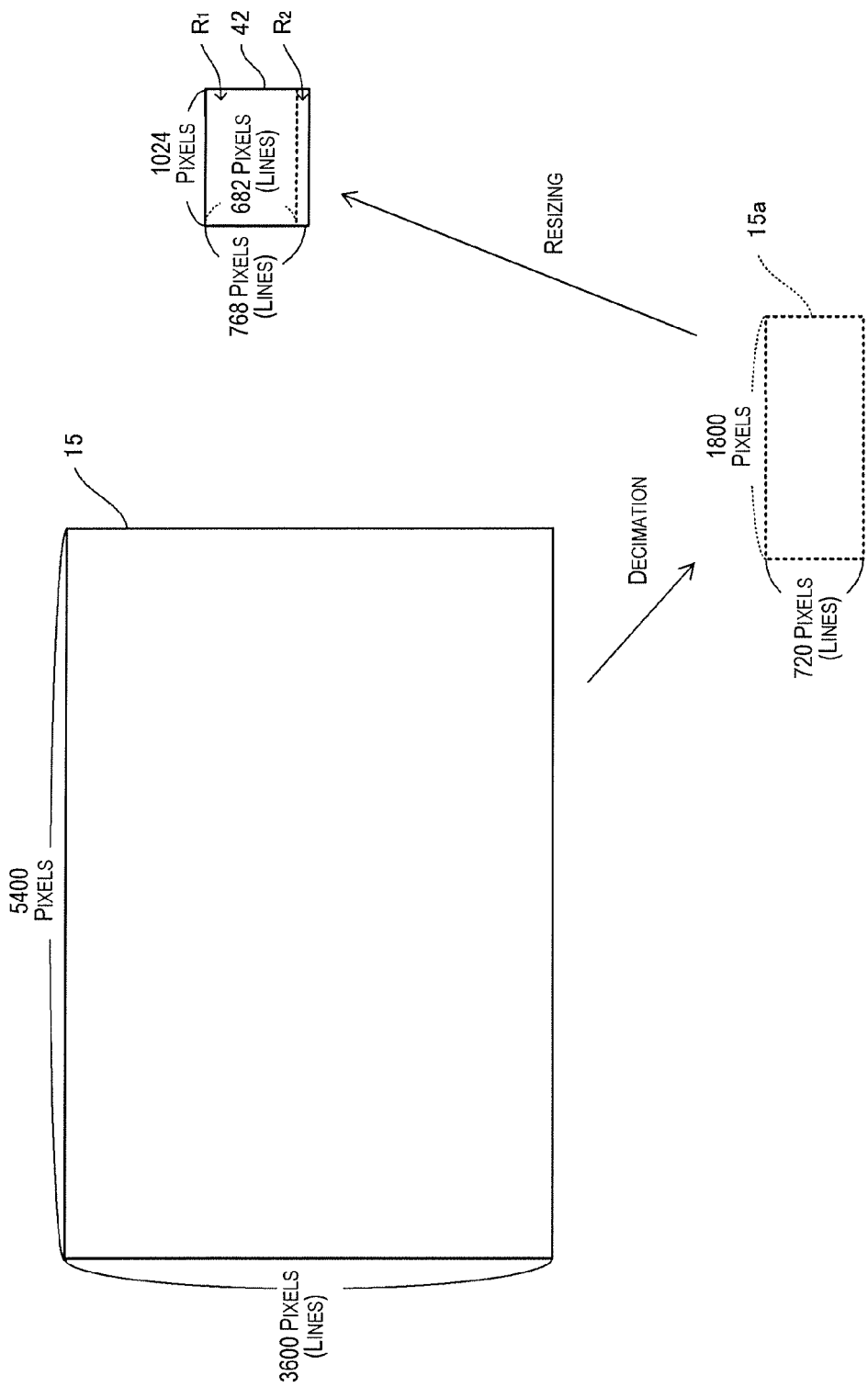
FIG. 2 is a view showing the number of pixels of the area image sensor and the liquid crystal panel.

In a case in which image data indicating a subject are recorded in the removable memory or the like, and printing or another operation is considered, the number of pixels of the area image sensor 15 must be greater than a predetermined number in order to obtain high-quality image data. Therefore, the effective number of pixels of the area image sensor 15 in the present embodiment is 5400 pixels in the horizontal direction and 3600 pixels in the vertical direction, as shown in FIG. 2. The area image sensor 15 is provided with a large number of pixels in excess of the effective pixels in the horizontal direction and the vertical direction, but in order to simplify the present specification, no description is given of the processing that relates to pixels other than the effective pixels.

On the other hand, the liquid crystal panel 42 is provided with 1024 pixels in the horizontal direction and 768 pixels in the vertical direction, as described above, and is configured so that the image of the subject is displayed in the subject image display region (R1 shown in FIG. 2). In the present embodiment, in order to display the image of the subject as large as possible while maintaining the aspect ratio (2:3) of the area image sensor 15, a rectangular region having an aspect ratio of 2:3 in which the top edge and left and right edges are adjacent to the top edge and left and right edges of the liquid crystal panel 42 is used as the subject image display region R1 for displaying the image of the subject. The remaining region is the information display region (region shown in FIG. 2) for displaying characters indicating image-capturing conditions or other information. Consequently, the subject image display region R1 in the liquid crystal panel 42 is composed of 1024 pixels in the horizontal direction and 682 pixels in the vertical direction. As described above, the number of pixels of the area image sensor 15 and the number of pixels of the liquid crystal panel 42 are not the same in the present embodiment.

Furthermore, since the display in the display section 40 is utilized by the user for the purpose of confirming the subject, when the delay between timing coincident with capture of the subject by the area image sensor 15 and timing corresponding to display of the image of the subject by the display section 40 increases to a length that is noticeable by the user, to the extent that the subject viewed in the EVF and the recorded image of the subject are misaligned, the EVF becomes extremely difficult to use. The delay must therefore be minimal when the display section 40 is used as an EVF.

Therefore, in order for the image captured by the area image sensor 15 to be displayed in the display section 40 so that the delay is so extremely short as to not be seen by the human eye, a configuration is adopted in the present embodiment whereby various types of processing are performed by the area image sensor 15 and the image data generation section 20, and the display section 40 causes the image data generated as a result of the processing to be displayed at high speed.

In other words, the area image sensor 15 according to the present embodiment is provided with a circuit capable of executing interlaced scanning for reading the detection results of the photodiodes at a ratio of 1 for every n (where n is an odd number) lines aligned in the vertical direction. An adder is also provided for adding m (where m is a natural number) detection results aligned in the horizontal direction among the photodiodes for performing photoelectric conversion via color filters of the same color, and outputting 1/m of the sum (i.e., outputting the arithmetic average of the m detection results). The present embodiment is configured so that when the display section 40 is caused to function as an EVF, interlaced scanning and processing by the adder are executed in the area image sensor 15, whereby pixels in the horizontal direction and the vertical direction are decimated, and the output data of a smaller number of pixels than the number of pixels provided to the area image sensor 15 are outputted, and the subject can thereby be captured at high speed.

Figure 3:
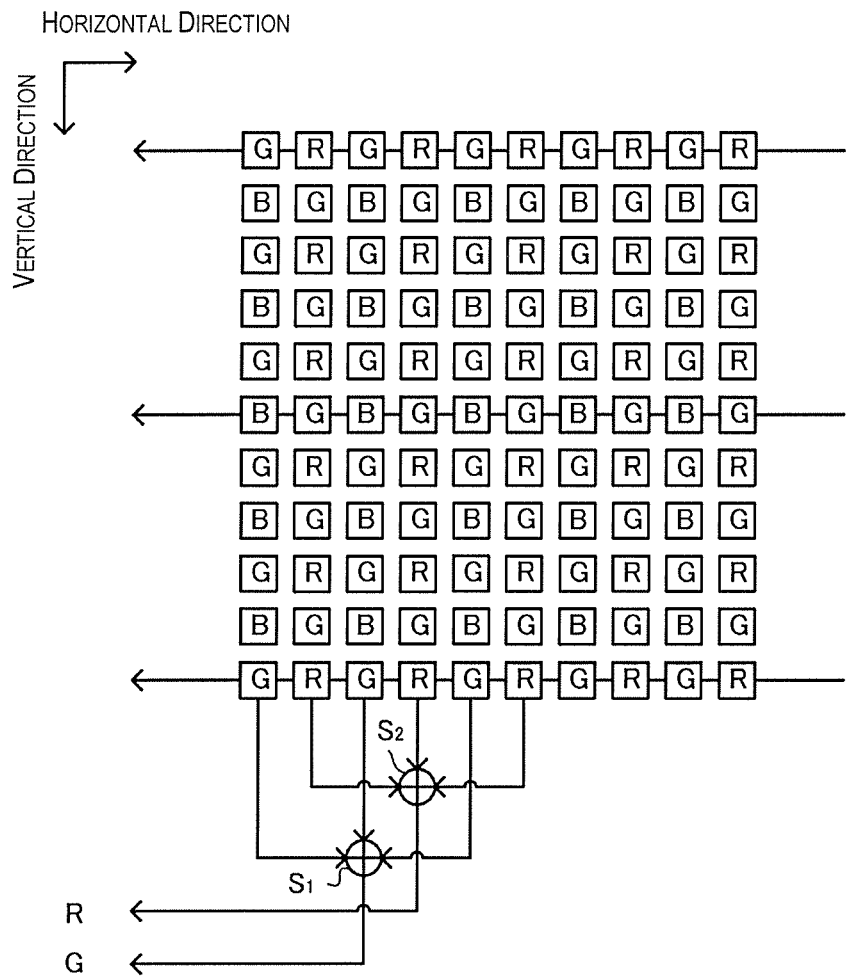
FIG. 3 is a view showing an example of the method for outputting the output data of the area image sensor.

In other words, in a live view mode for causing the display section 40 to function as an EVF, the area image sensor 15 reads for lines in the vertical direction at a ratio of 1 for every n lines in accordance with the horizontal synchronization signal SHsync. Processing for outputting the result of adding the detection results of m photodiodes by the adder is also performed in accordance with the data clock signal SDotclock. FIG. 3 shows an example of the method for outputting the output data of a smaller number of pixels than the number of pixels provided to the area image sensor 15 in the present embodiment. In FIG. 3, the rectangles labeled R indicate photodiodes that correspond to color filters for transmitting light in a red spectrum, the rectangles labeled G indicate photodiodes that correspond to color filters for transmitting light in a green spectrum, and the rectangles labeled B indicate photodiodes that correspond to color filters for transmitting light in a blue spectrum.

As shown in FIG. 3, in a case in which the color filters of the pixels indicated by rectangles are in a Bayer array, since a color filter of only one color corresponds to each pixel, the color of each pixel must be interpolated by utilizing the surrounding pixels. Therefore, when lines are decimated to acquire the output data, decimation must be performed so that the color filters of adjacent lines after decimation are of a different color. Therefore, in the present embodiment, by acquiring the detection values in the photodiodes of each line at a ratio of 1 line for every n lines (where n is an odd number)

as the output data, it is possible to acquire output data in which the color of each pixel can be specified by interpolation. In the present embodiment, a configuration is adopted in which the output data are acquired at a ratio of 1 line for every 5 lines in order to make the number of lines in the vertical direction of the area image sensor 15 as close as possible to the number of lines in the vertical direction of the subject image display region R1 of the liquid crystal panel 42. In FIG. 3, the left-directed arrows indicate that output data are acquired at a ratio of 1 line for every 5 lines, and in this example, the number of lines in the vertical direction is 1/5, i.e., 720.

In a case in which the color filters are in a Bayer array, the colors of adjacent pixels in the horizontal direction are different, and the same color of color filter occurs at every other position. Therefore, decimation processing can essentially be performed by adding m at every other pixel for pixels aligned in the horizontal direction and multiplying the sum by 1/m (i.e., calculating the arithmetic average of m detection results). In the present embodiment, m is set to 3, due to such factors as limitations for the sake of image quality in cases in which arithmetic averaging is performed by the adder. In the configuration shown in FIG. 3, in the lowest line shown, the detection results of the three photodiodes aligned in the horizontal direction that are photodiodes for performing photoelectric conversion via green color filters are added by an adder S1 and multiplied by 1/3, and the detection results of the three photodiodes aligned in the horizontal direction that are photodiodes for performing photoelectric conversion via red color filters are added by an adder S2 and multiplied by 1/3. In this example, the number of pixels in the horizontal direction is 1/3, i.e., 1800 pixels. In FIG. 2, the data size after decimation in the area image sensor 15 is indicated by the dashed-line rectangle 15a.

As described above, in the area image sensor 15, the number of lines in the vertical direction may be set to 720, and the number of pixels in the horizontal direction may be set to 1800. However, in such decimation, because of n being an odd number in the vertical direction, m being a natural number in the horizontal direction, and other such limitations for the sake of image quality, the number of pixels after decimation and the number of pixels of the subject image display region R1 of the liquid crystal panel 42 do not readily coincide. In a case in which n and m differ, as described above, the aspect ratio differs between the subject and the subject image on the liquid crystal panel 42.

A configuration is therefore adopted in the present embodiment in which resizing is further performed in the image data generation section 20 for the decimated output data, and image data are generated for display in the subject image display region R1 of the liquid crystal panel 42. In other words, the image data generation section 20 is provided with a pixel interpolation section 20a, a color reproduction processing section 20b, a filter processing section 20c, a gamma correction section 20d, and a resizing processing section 20e. In this configuration, the number of pixels in the vertical direction and the horizontal direction is modified by the resizing processing section 20e in the process of generating the image data, and image data are generated which are equivalent to the number of pixels of the subject image display region R1 of the liquid crystal panel 42.

The line buffer 52a is a buffer memory for temporarily recording the decimated output data outputted from the area image sensor 15, and when the decimated output data are outputted from the area image sensor 15, the output data are temporarily recorded in the line buffer 52a by the processing of the image data generation section 20. The pixel interpolation section 20a imports data of the necessary number of pixels for generating the colors of the two channels missing in each pixel in the Bayer array from the line buffer 52a, and while doing so, generates the colors of the two channels by interpolation processing. As a result, three channels of data are generated in each pixel. The color reproduction processing section 20b then performs color conversion processing for color matching by performing a 3×3 matrix computation based on the generated data. The data generated by color conversion processing are temporarily recorded in the line buffer 52b. The filter processing section 20c then executes sharpness adjustment, noise removal processing, and other processing by filter processing. The gamma correction section 20d then executes gamma correction to compensate for a characteristic difference between the colors indicated by the gradation values of the output data of the area image sensor 15 and the colors indicated by the gradation values of the image data handled by the display section 40. The data generated by gamma correction are temporarily recorded in the line buffer 52c.

The data recorded for each line, i.e., line by line, in the line buffer 52c are the number of pixels decimated in the area image sensor 15. In other words, data of 720 lines in the vertical direction and 1800 pixels in the horizontal direction are recorded line by line. The resizing processing section 20e performs resizing by sequentially referencing the data recorded in the line buffer 52c to perform interpolation computation processing and specify the gradation value of each channel in the positions between pixels. In the present embodiment, since the decimation in the area image sensor 15 described above is 1/5 in the vertical direction and 1/3 in the horizontal direction, the aspect ratio of the decimated data differs from the aspect ratio of the output data of the area image sensor 15, as shown in the rectangle 15a in FIG. 2. Therefore, the resizing processing section 20e first performs reduction processing for reduction to a size of approximately 57% in the horizontal direction based on the data recorded in the line buffer 52c. As a result, the number of pixels in the horizontal direction is set to 1024. The resizing processing section 20e also performs reduction processing for reduction to a size of approximately 95% in the vertical direction. As a result, image data are generated for which there are 1024 pixels in the horizontal direction and 682 lines in the vertical direction. The generated image data are recorded line by line in the line buffer 52d.

In the present embodiment, by the processing described above, generation processing is performed for generating image data that can be displayed in the subject image display region R1 of the liquid crystal panel 42 based on the output data of the area image sensor 15, but the output data of the area image sensor 15 have 720 lines in the vertical direction, whereas the number of lines of the image data in the vertical direction is 682, and the number of lines of the liquid crystal panel 42 in the vertical direction is 768. In other words, different numbers of lines are required to capture a single frame and to display a single frame.

In the present embodiment, in the area image sensor 15 and the liquid crystal panel 42, the horizontal synchronization signals SHsync, DHsync are set in respectively independent fashion. Similarly, the data active signals SDactive, DDactive and the data clock signals SDotclock, DDotclock are set in respectively independent fashion. Specifically, the vertical synchronization period specified by the vertical synchronization signals SVsync, DVsync has common length in the area image sensor 15 and the liquid crystal panel 42. However, the number of image capture lines and the number of display lines differ between the area image sensor 15 and the liquid crystal panel 42 in the manner discussed previously. Accordingly, the cycles of the horizontal synchronization signals, the data active signals, and the data clock signals are set such that appropriate image capture and display can take place in respectively independent fashion in conformity to the number of lines in the area image sensor 15 and the number of lines in the liquid crystal panel 42.

In other words, the timing generator 30 outputs the horizontal synchronization signal SHsync the number of times and at the timing whereby the decimation in the vertical direction such as described above can be performed in the area image sensor 15, and the output data of the number of lines of a single frame can be acquired within the period prescribed by the vertical synchronization signal SVsync. The timing generator 30 also outputs the data clock signal SDotclock the number of times and at the timing whereby decimation in the horizontal direction such as described above can be performed, and the output data of the number of pixels of a single line can be acquired within the period prescribed by the horizontal synchronization signal SHsync.

On the other hand, in order to minimize the delay time and perform display in the liquid crystal panel 42 based on the output data outputted line by line from the area image sensor 15, a configuration is adopted in the present embodiment whereby the horizontal synchronization signal DHsync is outputted at the time that the image data for display of each line of the liquid crystal panel 42 are prepared. In other words, the liquid crystal panel 42 in the present embodiment is capable of displaying lines for which processing by the resizing processing section 20e is ended. The timing generator 30 therefore outputs the horizontal synchronization signal DHsync for displaying the $N^{th}$ line in the vertical direction of the liquid crystal panel 42 at the time that the processing for generating the image data of the $N^{th}$ line (where N is a natural number) is ended.

Specifically, the timing generator 30 is provided with a progress information acquisition section 30a, and the progress information acquisition section 30a is capable of acquiring, from the resizing processing section 20e, progress information for indicating a line for which the processing for generating image data is ended in the resizing processing section 20e. Consequently, through this progress information, it is possible to specify a line that can be displayed in the liquid crystal panel 42 based on the image data. Therefore, in this configuration, the timing generator 30 outputs the horizontal synchronization signal DHsync in synchrony with the timing at which the processing for generating the image data of each line is ended, and display of a line for which the processing for generating the image data is thereby started in the liquid crystal panel 42. Through this configuration, display of each line does not start before preparation of the image data is finished, and each line can be immediately displayed with the display preparation thereof is finished.

Since the liquid crystal panel 42 is preferably capable of displaying the pixels of each line of the liquid crystal panel 42 within the horizontal synchronization period prescribed by the output timing of the horizontal synchronization signal DHsync, the timing generator 30 outputs the data active signal DDactive and the data clock signal DDotclock so that the pixels of a single line can be displayed within a period assumed to be the period in which the horizontal synchronization period prescribed by the output timing of the horizontal synchronization signal DHsync is shortest.

According to a configuration such as the above, the output timing of the horizontal synchronization signal DHsync may be delayed in cases where considerable time was needed for processing by the resizing processing section 20e, making it necessary to cancel out the delay in question in order for the vertical synchronization signal DVsync to have a constant cycle. Accordingly, the timing generator 30 lengthens or shortens the horizontal synchronization period with respect to a predetermined reference period TH in order to cancel out temporal fluctuations from the reference period TH and thereby control the output signal such that the vertical synchronization period for displaying single frames in the liquid crystal panel 42 remains constant. More specifically, in the present embodiment, there is attained a condition whereby the horizontal synchronization period may be lengthened by waiting for the output of the horizontal synchronization signal DHsync until processing for generating the image data of each line has ended in the subject image display region R1. In the information display region R2 of the liquid crystal panel 42 for displaying characters indicating image-capturing conditions or other information, the horizontal synchronization period is made shorter than the reference period TH so as to cancel out the cumulative total of the difference of the horizontal synchronization period lengthened in the subject image display region R1 and the reference period TH. The reference period TH is configured as the horizontal synchronization period in a case in which each of the total number of lines of the liquid crystal panel 42 is displayed for an equal period within the vertical synchronization period.

Figure 4:
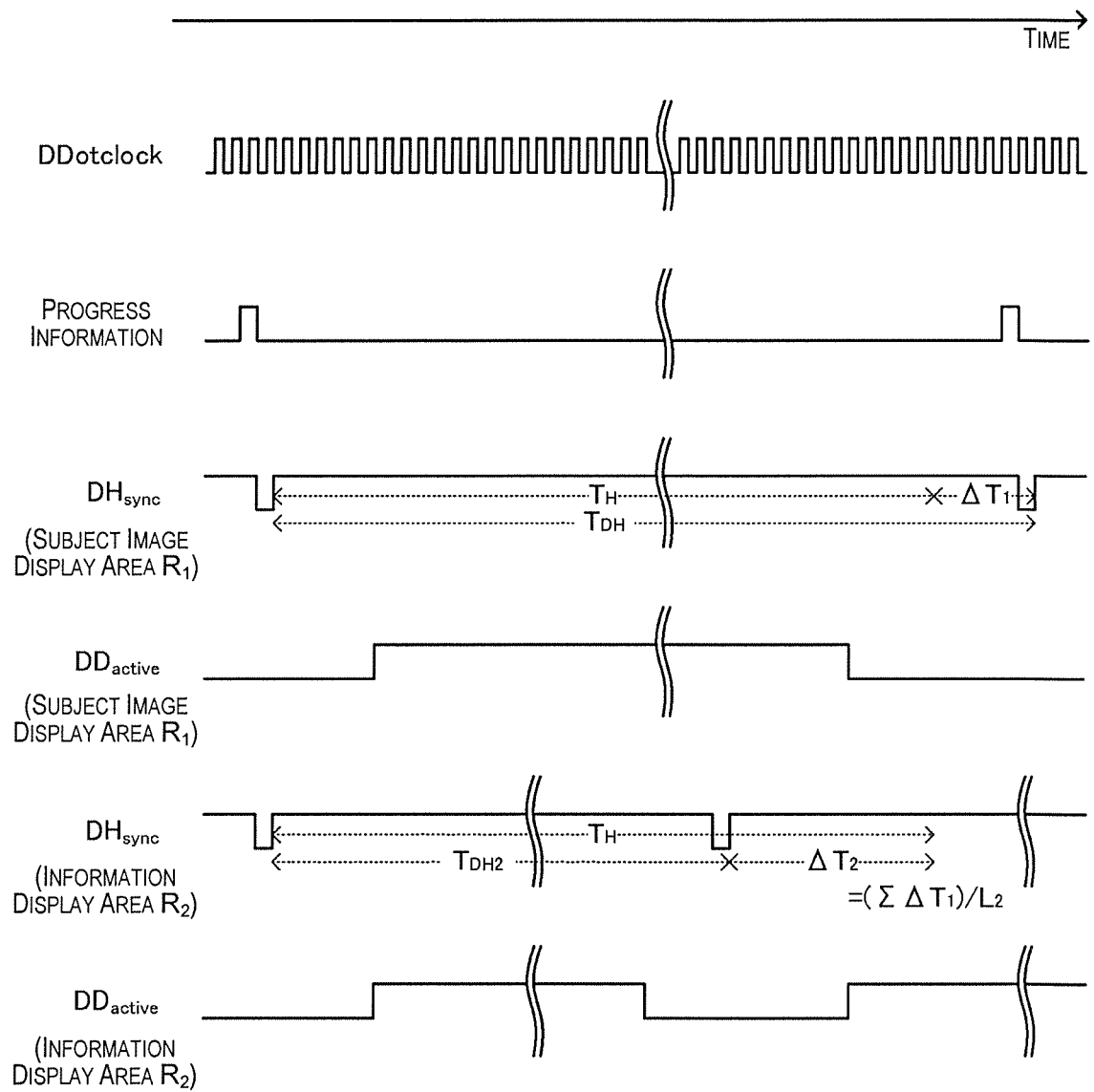
FIG. 4 is a timing chart showing the signals applied to the display section according to the present embodiment.

FIG. 4 shows the horizontal synchronization signal DHsync outputted from the timing generator 30 configured as described above, and also shows the data active signal DDactive, the data clock signal DDotclock, and the progress information. The progress information outputted from the resizing processing section 20e in the present embodiment is composed of a single pulse in which a low-level output is maintained as the processing for generating the image data for a single line is being executed, and a high-level output occurs at a predetermined period at the time that the processing for generating the image data for a single line is ended.

When the timing generator 30 acquires the progress information through the progress information acquisition section 30a, the horizontal synchronization signal DHsync is outputted in synchrony with the pulse of the progress information by the processing of the display control section 30b. Therefore, even in a case in which the processing for generating the image data of a certain line fails to occur within the reference period TH, the horizontal synchronization signal DHsync is not outputted until the generation processing is ended, and a horizontal synchronization period TDH becomes longer than the reference period TH. Consequently, in a case in which the processing for generating the image data of a certain line fails to occur within the reference period TH, display of the certain line is not started in the liquid crystal panel 42 until the generation processing is completed. Display is also not performed before preparation of the image data of each line is ended. Furthermore, since the horizontal synchronization signal DHsync is outputted when the processing for generating the image data of a certain line is ended, the image data of each line is displayed without delay when preparation thereof is ended. As described above, according to the present embodiment, the liquid crystal panel 42 is driven under conditions such that the horizontal synchronization period TDH may be longer than the reference period TH, and therefore even if the generation period of image data equivalent to a single line for display on the liquid crystal panel 42 fluctuates on a line-by-line basis, display on the liquid crystal panel 42 can take place under a condition of minimized delay of individual lines. Consequently, in a configuration as described in the present embodiment, in which the vertical synchronization period of the area image sensor 15 and the liquid crystal panel 42 may fluctuate through modification of the power mode and as a result the generation period of image data may fluctuate for each individual line, display on the liquid crystal panel 42 can take place under conditions of minimized delay of the individual lines, regardless of the power mode.

Additionally, there may be contemplated various other modes in which the speed of the data output process of the area image sensor 15 or of the image data generation process by the image data generation section 20 can differ on a line-by-line basis. For example, there may be contemplated a mode in which process speed can differ on a line-by-line basis, in a manner dependent upon image capture conditions or upon the hardware utilized for image capture. The present invention can also be applied to a configuration in which the vertical synchronization period or the horizontal synchronization period of the area image sensor 15 fluctuates, or the period needed for processing for generating image data fluctuates due to the changing of an interchangeable EVF or an interchangeable lens.

As described above, in the subject image display region R1 in the present embodiment, the timing generator 30 adjusts the horizontal synchronization period TDH in accordance with the progress information outputted from the resizing processing section 20e. The horizontal synchronization signal DHsync may therefore be lengthened according to the progress of the processing for generating the image data to be displayed in the subject image display region R1, and the horizontal synchronization period TDH prescribed by the horizontal synchronization signal DHsync of the liquid crystal panel 42 is not necessarily constant. On the other hand, since the vertical synchronization period prescribed by the vertical synchronization signal DVsync is constant in the present embodiment, as described above, the timing generator 30 sets the output timing of the horizontal synchronization signal DHsync so that a horizontal synchronization period TDH2 is shorter than the abovementioned reference period TH in the information display region R2, so that displaying of all the lines of the liquid crystal panel 42 ends within the vertical synchronization period even in a case in which the horizontal synchronization period TDH in the subject image display region R1 is lengthened.

In other words, since the data (referred to as OSD data) of the characters indicating the image-capturing conditions or other information can be created in advance and recorded in advance in the VRAM 51 irrespective of operation of the area image sensor 15, an appropriate display can be performed without overtaking the reading of data even when a display based on the OSD data is executed according to a short horizontal synchronization period. Therefore, in the present embodiment, the horizontal synchronization period in the information display region R2 for displaying characters indicating image-capturing conditions or other information is set so as to be shorter than that of the subject image display region R1 for producing a display based on the output data of the area image sensor 15.

Specifically, the timing generator 30 adjusts the output timing of the horizontal synchronization signal DHsync, and thereby shortens the horizontal synchronization period TDH2 so that the sum of the differences of the lengthened horizontal synchronization period TDH and the reference period TH in the subject image display region R1, and the sum of the differences of the shortened horizontal synchronization period TDH2 and the reference period TH in the information display region R2 coincide. As a result, the following relation obtains: horizontal synchronization period TDH2<reference period≤horizontal synchronization period TDH. Various configurations can be adopted in the information display region R2 as configurations whereby the horizontal synchronization signal DHsync is outputted so that the horizontal synchronization period TDH2 is shorter than the reference period TH. For example, as shown in FIG. 4, a configuration may be adopted in which the period of shortening in each line is equal to a value $\Delta T2$ obtained by dividing the sum of delay $\Delta T1$ ($\Sigma \Delta T1$) with respect to the horizontal synchronization period TH generated in the subject image display region R1 by the number of lines L2 of the information display region R2. In other words, a configuration may be adopted in which the value of horizontal synchronization period TH–$\Delta T2$ is assumed to be the horizontal synchronization period TDH2 in the information display region R2.

As described above, in order to produce a suitable display in each region based on the horizontal synchronization signal adjusted for each region of the liquid crystal panel 42 in the present embodiment, the line numbers of the portions of the liquid crystal panel 42 that correspond to the subject image display region R1 and the information display region R2 are determined in advance. For example, in the example shown in FIG. 2, lines 1 through 682 are the subject image display region R1, and lines 683 through 768 are the information display region R2. Therefore, the timing generator 30 outputs the horizontal synchronization signal DHsync so that the horizontal synchronization period TDH2 is shorter than the above-mentioned reference period TH during display in the information display region R2 that corresponds to lines 683 through 768, while the timing generator 30 outputs the horizontal synchronization signal DHsync at a timing in accordance with the abovementioned progress information during display in the subject image display region R1 that corresponds to lines 1 through 682.

The ASIC 200 is also provided with an image data output section 201, and the image data output section 201 outputs the image data (Data) recorded in the line buffer 52d to the display section 40 line by line during display of lines 1 through 682 of the liquid crystal panel 42. As a result, the image of the subject captured by the area image sensor 15 is displayed in the subject image display region R1.

The CPU 50 records OSD data to the VRAM 51 prior to at least display in an information display region R2. During display in lines 683 through 768 of the liquid crystal panel 42, the image data output section 201 outputs the OSD data recorded in the VRAM 51 to the display section 40 line by line as the image data (Data). As a result, characters indicating image-capturing conditions and the like are displayed in the information display region R2.

Through this configuration, display of image-capturing conditions or other information by the OSD data is performed within a short horizontal synchronization period in the information display region R2, while the subject captured by the area image sensor 15 is displayed in the subject image display region R1 in a state of minimal delay. Then, in the manner described above, the horizontal synchronization periods are controlled such that the sum of differences between the reference period TH and the lengthened horizontal synchronization period TDH in the subject image display region R1 and the sum of differences between the reference period TH and the shortened horizontal synchronization period TDH2 in the information display region R2 coincide, whereby display by the display section 40 can take place under conditions in which the cycles of the vertical synchronization signals SVsync, DVsync are the same and constant. Consequently, the display in the liquid crystal panel 42 of the subject captured by the area image sensor 15 is not delayed by the period of a single frame or longer, and the same image does not remain displayed on the liquid crystal panel 42 for a plurality of frame periods.

(2-1) Display of Index

In the configuration above, because the vertical synchronization period fluctuates in accordance with the power mode in the manner described previously, the magnitude of the delay between the timing of subject image capture by the area image sensor 15 and the timing of subject image display by the liquid crystal panel 42 fluctuates in accordance with the fluctuations of the vertical synchronization period in question. Accordingly, because the delay in question may pose an impediment to capture of an image in the manner intended by the user, the present embodiment adopts a configuration whereby an index which corresponds to the delay in question is displayed on the index display section. While it is possible for the index display section in question to be any display section producing an index that is noticeable to the user, for example, a configuration involving display on a liquid crystal panel provided separately from the display section 40 or one involving an LED display, in the present embodiment there is adopted a configuration in which the index in question is displayed in the information display region R2. In other words, in the present embodiment, a portion of the display panel 42 of the display section 40 constitutes the index display section.

Figure 5A:
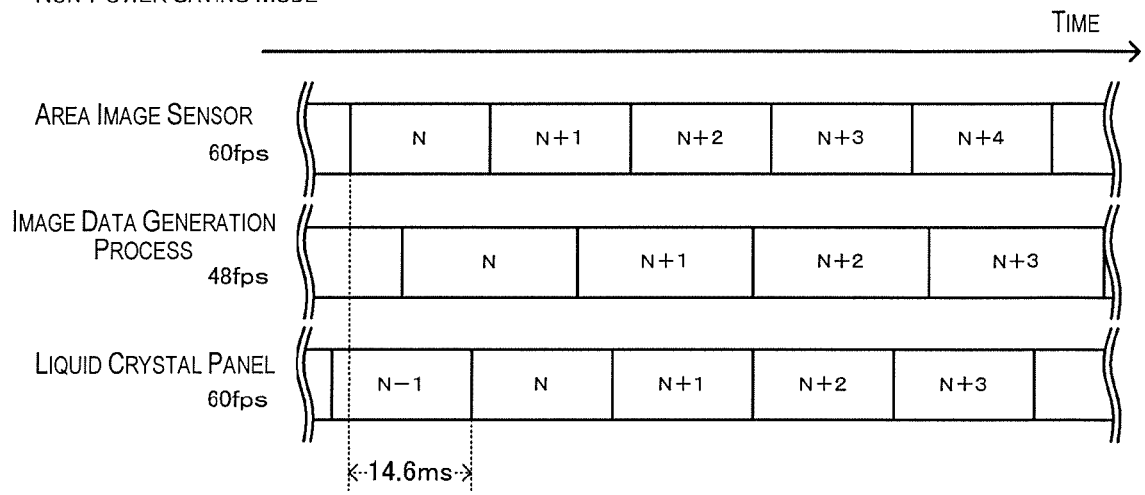
FIGS. 5A and 5B are diagrams showing an area image sensor, image data generation, and frame rate in a display section according to the present embodiment.
Figure 5B:
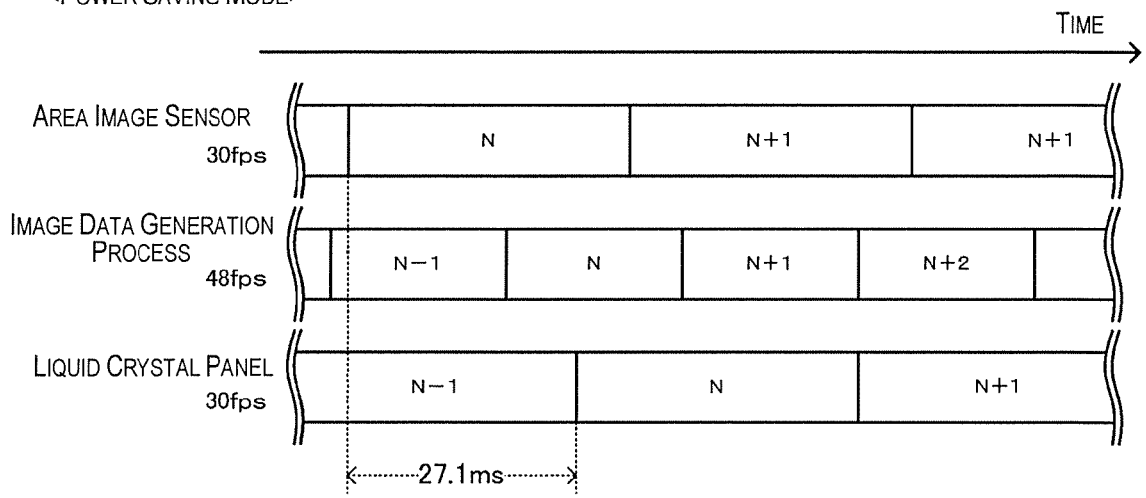

The CPU 50 generates the aforementioned OSD data of a condition that includes information indicating the index in question. Specifically, in the present embodiment, the magnitude of the delay in each power mode is specified in advance. FIGS. 5A and 5B are drawings showing examples of the magnitude of the delay in question. FIG. 5A, with the horizontal axis as the time axis, depicts frame rates in the area image sensor 15, in the image data generation process in the image data generation section, and in the liquid crystal panel 42, in non-power saving mode. FIG. 5B, with the horizontal axis as the time axis, depicts frame rates in the area image sensor 15, in the image data generation process in the image data generation section, and in the liquid crystal panel 42, in power saving mode. In these drawings, the plurality of rectangles lined up along the horizontal axis respectively indicate periods required for processing of a single frame, and the text N, etc., which appear inside each of the rectangles indicate frame number (N is a natural number).

In these examples, there are contemplated examples in which processing by the image data generation section 20 is executed in the same period regardless of power mode, with the frame rate being 48 fps. On the other hand, in the non-power saving mode depicted in FIG. 5A, the frame rate of the area image sensor 15 and of the liquid crystal panel 42 is 60 fps as noted above, whereas in the power saving mode depicted in FIG. 5B, the frame rate of the area image sensor 15 and of the liquid crystal panel 42 is 30 fps as noted above. Consequently, in the non-power saving mode, the vertical synchronization period of the area image sensor 15 is shorter than in the power saving mode, and in the non-power saving mode the image data generation process in the image data generation section 20 can be started at timing earlier than in the power saving mode. As a result, in non-power saving mode, display on the liquid crystal panel 42 can also be started at timing earlier than in the power saving mode. In this example, because the quantity of images displayed per unit time by the liquid crystal panel 42 is smaller at lower frame rates, in the case of a frame rate of 60 fps, the quantity of images displayed per unit time is greater than in the case of a frame rate of 30 fps.

Where processing by the area image sensor 15, the image data generation section 20, and the liquid crystal panel 42 is carried out in accordance with the relationships described above, in the examples shown in FIGS. 5A and 5B, the duration of the delay between the timing of the start of image capture of a subject (the start of exposure of a frame) and the timing that display of an image of the subject on the liquid crystal panel 42 begins (the start of display of the first line of the corresponding frame) is 14.6 ms in the non-power saving mode, and 27.1 ms in the power saving mode. Such delays are specifiable in advance in accordance with the current mode. In the present embodiment, the magnitude of such delays in each of the power modes is specified in advance, an icon for indicating the delay in each mode is created in advance, and information indicating the icon in question is recorded to the ROM 53 or the like. The CPU 50 specifies the power mode which was instructed by the operating section 55 during generation of the OSD data, and extracts an icon in accordance with the specified power mode from the ROM 53 or the like. The CPU 50 then superimposes the icon in question with information indicating image capture parameter and the like to generate OSD data, which is recorded to the VRAM 51. As a result, in non-power saving mode, in the manner depicted in FIG. 8 (*a*) for example, a triangle shaped icon can be displayed by representing the delay duration in the information display region R2 which is provided at the bottom of the liquid crystal panel 42. This icon expresses the duration of delay through a decreasing number of black triangle shapes leftward with longer delay durations, and through an increasing number of black triangle shapes rightward with shorter delay durations.

Figure 8:
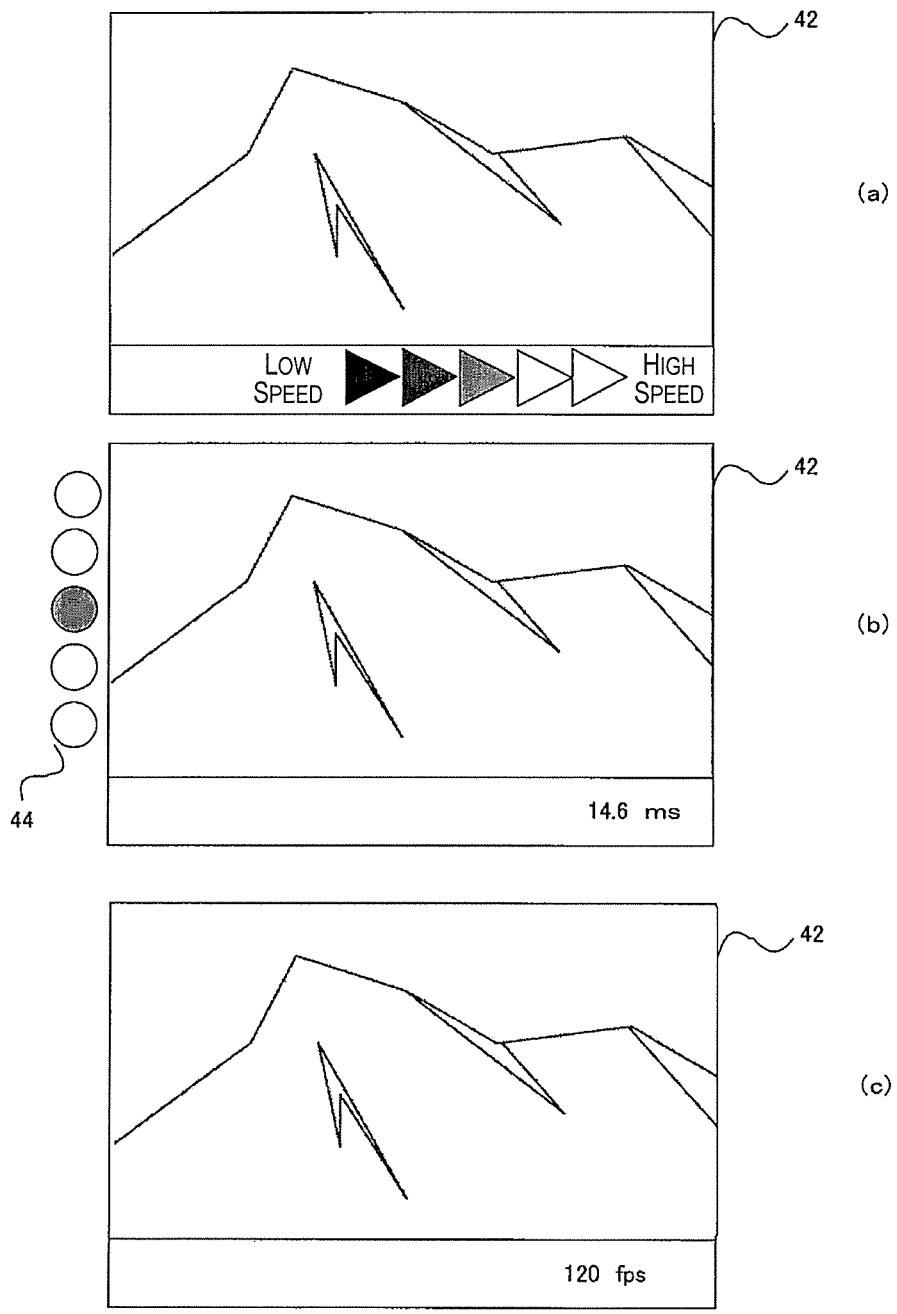
FIG. 8 is a diagram representing a display in the present embodiment.

Consequently, by outputting to the display section 40 the image data that was recorded to the VRAM 51 by the image data output section 201 during display in the information display region R2, an index reflecting the power mode and corresponding to the delay between the timing of the start of image capture of a subject and the timing that display of an image of the subject on the liquid crystal panel 42 begins is displayed in the information display region R2. As a result, it is possible for a user observing the index in question to ascertain the extent of the delay on the display section 40. Here, the icon provided as the index indicates the magnitude of the delay through a color, a graphic, a symbol, or the like; however, it suffices for the index in question to indicate information which corresponds to the delay, and other modes may be adopted. For example, such information may indicate the magnitude of the delay directly through numerical values such as the number of seconds of delay, i.e., 14.6 ms or 27.1 ms as shown in FIG. 8 (*b*); or the information may indicate the frame rate directly or indirectly as shown in FIG. 8 (*c*). Besides a configuration in which the magnitude of delay is defined as that between the timing of the start of image capture of the aforementioned subject and the timing that display of an image of the subject begins, the magnitude of delay may also be defined based on other timing, such as that between the timing of completion of exposure of a frame and the timing of completion of display of the frame, or that between the timing of the start of exposure of a frame and the timing of completion of display of the frame. In FIG. 8 (*b*), in addition to representing the magnitude of delay by display on the liquid crystal panel 42, the magnitude of delay is also represented by illuminating LEDs 44 which are provided to the left of the liquid crystal panel 42, doing so by illuminating a more highly situated LED 44 in association with a shorter delay duration. Alternatively, a single LED 44 may be provided, and may indicate the magnitude of delay by some other method, such as by flashing faster in association with shorter delay duration.

(3) Other Embodiments

The embodiment described above is an example of an implementation of the present invention, but various other possible embodiments can be envisioned, such as combinations of the following embodiments, provided that an index that corresponds to delay between timing corresponding with image capture of a subject by the image-capturing sensor and timing corresponding to display of an image of the subject by the liquid crystal panel 42 is displayed by an index display section.

For example, a back porch of the horizontal synchronization signal DHsync may be lengthened when the horizontal synchronization period TDH is made longer than the reference period TH. In this configuration, the output period of progress information from the resizing processing section 20e is detected in the progress information acquisition section 30a in the configuration shown in FIG. 1. In other words, the period TS(N−1) is detected between the progress information outputted at the time that processing for generating the image data of the (N−1)$^{th}$ line is ended and the progress information outputted at the time that processing for generating the image data of the N$^{th}$ line is ended. The timing generator 30 then determines the length of the back porch of the horizontal synchronization signal DHsync of the N$^{th}$ line based on the period TS(N−1), and outputs various types of signals.

Figure 6:
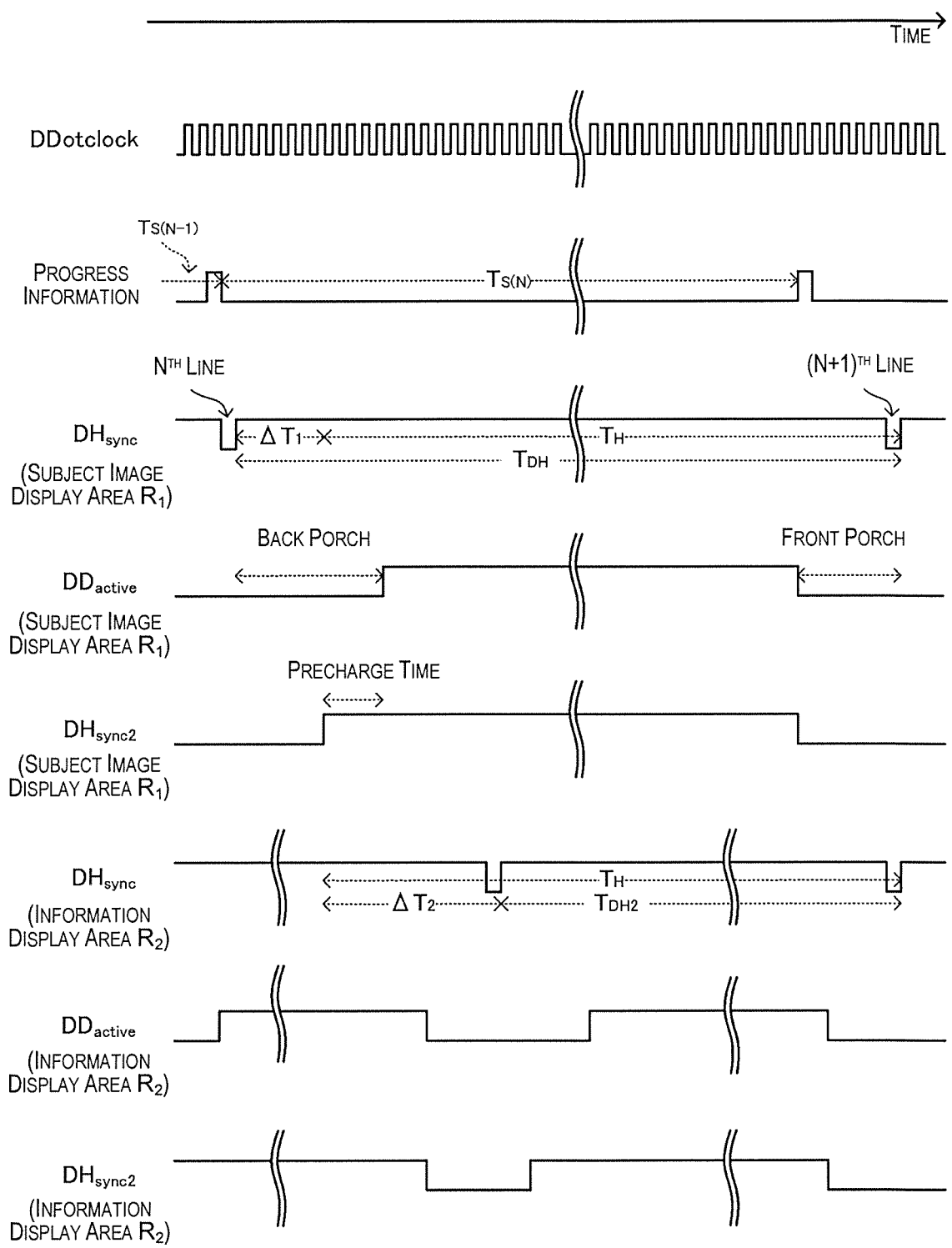
FIG. 6 is a timing chart according to another embodiment of the present invention.

In other words, by the processing of the display control section 30b, the timing generator 30 outputs a signal DHsync2 indicating a precharge period when a period ΔT1 has elapsed after outputting of the horizontal synchronization signal DHsync of the N$^{th}$ line, as shown in FIG. 6, the period ΔT1 being obtained by subtracting the length of the reference period TH from the length of the period TS(N−1). By the processing of the display control section 30b, the timing generator 30 then outputs DDactive when the predetermined precharge period has elapsed after outputting of the signal DHsync2, and outputs the horizontal synchronization signal DHsync of the (N+1)$^{th}$ line, providing a front porch having a predetermined period after maintaining the level of DDactive until the data clock signal DDotclock of the number of pixels of a single line is outputted. The period from the start of the precharge period until the end of the front porch coincides with the reference period TH. Consequently, the horizontal synchronization period TDH, which is the period between the horizontal synchronization signal DHsync of the N$^{th}$ line and the horizontal synchronization signal DHsync of the (N+1)$^{th}$ line, is the sum of the reference period TH and ΔT1. As a result, N lines can be displayed with precharging, inversion, and other operations synchronized with the signal DHsync2 in the liquid crystal panel 42, and the horizontal synchronization period TDH can be made longer than the reference period TH. In the first embodiment described above, since the front porch of the horizontal synchronization signal DHsync is lengthened, the back porch period can be set as a constant period, and the period for performing precharging, inversion, and other operations can be provided according to normal specifications.

In the embodiment described above, the horizontal synchronization signal SHsync is outputted so that the horizontal synchronization period is shorter in the information display region R2 of the liquid crystal panel 42 than in the subject image display region R1, in order to cause the cycle of the vertical synchronization signal SVsync of the area image sensor 15 and the cycle of the vertical synchronization signal DVsync of the liquid crystal panel 42 to coincide, but the cycle of the vertical synchronization signal SVsync and the cycle of the vertical synchronization signal DVsync of the liquid crystal panel 42 can be made to coincide by another method. For example, since the area image sensor 15 has a larger number of lines than the liquid crystal panel 42 in a normal image-capturing device, in a case in which the horizontal synchronization period that should be maintained within a specific vertical synchronization period is assumed to be equal, the horizontal synchronization signal DHsync of the liquid crystal panel 42 is shorter than the horizontal synchronization signal SHsync of the area image sensor 15. Consequently, even in a case in which the horizontal synchronization signal DHsync of the liquid crystal panel 42 is lengthened, it is not often necessary to lengthen the vertical synchronization period of the liquid crystal panel 42 according to the lengthening of the horizontal synchronization signal DHsync. In a case in which lengthening the horizontal synchronization signal DHsync causes the vertical synchronization signal DVsync of the liquid crystal panel 42 to be longer than the vertical synchronization signal SVsync of the area image sensor 15, the vertical synchronization signal SVsync of the area image sensor 15 may be lengthened, and the vertical synchronization signal DVsync and vertical synchronization signal SVsync may be synchronized.

In the embodiment described above, a configuration is adopted in which progress information is acquired which indicates for each line whether the resizing processing of the processing for generating image data is ended, but any configuration may be adopted insofar as progress information for the processing of the final step is acquired, even in a case in which the final step of the processing for generating the image data is not the resizing processing. A configuration may also be adopted in which the progress information is acquired for processing of a step prior to the final step (e.g., a step in which the processing time may fluctuate), insofar as processing can be performed at such a high speed that the processing time of the final step of processing for generating the image data can be ignored, processing can be performed in a certain time, or it is possible to predict the ending of the final step. In a case in which an image processing step is included for referencing the data of a plurality of lines and generating data of a single line in the processing for generating the image data, the progress information may be acquired for the included step.

Figure 7:
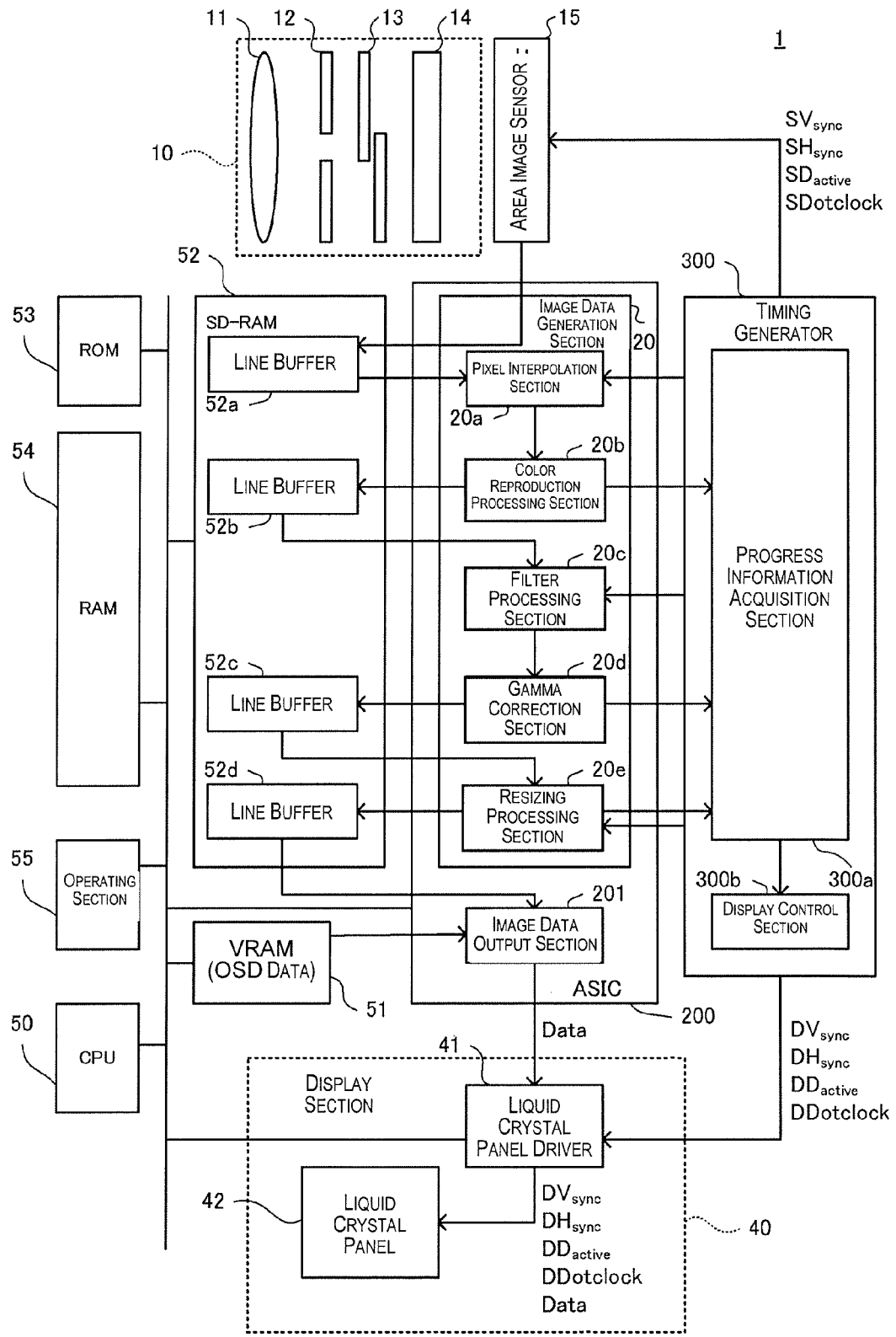
FIG. 7 is a block diagram according to another embodiment of the present invention.

FIG. 7 is a view showing an image-capturing device 1 that is configured so as to acquire progress information for a plurality of image processing steps for referencing the data of a plurality of lines to generate data of a single line. In FIG. 7, the same reference symbols as those of FIG. 1 are used to refer to constituent elements that are the same as those in FIG. 1. A timing generator 300 of the image-capturing device 1 shown in FIG. 7 is capable of acquiring progress information which indicates a line for which outputting of the output data from the area image sensor 15 is completed, and a line for which the processing for generating data in each of the color reproduction processing section 20b, the gamma correction section 20d, and the resizing processing section 20e of the image data generation section 20 is ended. By the processing of a display control section 300b, the timing generator 300 is capable of outputting a trigger signal (e.g., a horizontal synchronization signal) for starting processing for generating data of a single line to each of the pixel interpolation section 20a, the filter processing section 20c, and the resizing processing section 20e.

In other words, in the embodiment shown in FIG. 7, processing of data of an Lth line can be executed in the pixel interpolation section 20a when the output data of a Kth line is outputted from the area image sensor 15, and as a result of line-by-line processing by the pixel interpolation section 20a and the color reproduction processing section 20b, specification is made in advance that the processing of data of an Mth line in the filter processing section 20c can be executed when processing of the data of the Lth line is ended. As a result of line-by-line processing by the filter processing section 20c and the gamma correction section 20d, specification is also made in advance that the processing for generating image data of an $N^{th}$ line can be started in the resizing processing section 20e when processing of the data of the Mth line is ended.

The timing generator 300 specifies that output data of the Kth line is outputted from the area image sensor 15 based on a horizontal synchronization signal SHsync having a prescribed cycle outputted by the timing generator 300. In a case in which specification is made that the output data of the Kth line is outputted from the area image sensor 15, the timing generator 300 outputs the trigger signal to the pixel interpolation section 20a to start data processing of the Lth line. In a case in which a progress information acquisition section 300a specifies that processing of the data of the Lth line is ended in the color reproduction processing section 20b, the timing generator 300 outputs the trigger signal to the filter processing section 20c to start data processing of the Mth line. In a case in which the progress information acquisition section 300a specifies that processing of the data of the Mth line is ended in the gamma correction section 20d, the timing generator 300 outputs the trigger signal to the resizing processing section 20e to start processing for generating the image data of the $N^{th}$ line.

When specification is made that processing for generating the image data of the $N^{th}$ line by the resizing processing section 20e is ended, the timing generator 300 outputs the horizontal synchronization signal DHsync for displaying the $N^{th}$ line, in the same manner as in the embodiment described above. In other words, in the image data generation section 20, in an image processing step in which it is possible to start generating data of a line which is subsequent to recording of the data of two or more lines in a line buffer, a determination is made as to whether processing for generating data of the lowest necessary number of lines is ended, and the next image processing step is started at the time that the generation processing is ended. Through this configuration, processing for each line does not start before preparation of the necessary data for executing each step is finished, and processing for each line can be immediately started when the data of each line are prepared. As a result, the wait time during execution of each image processing step is minimized. In the present embodiment, since the data of only the lowest necessary number of lines is temporarily recorded in the line buffers 52a through 52d, the capacity of the line buffers 52a through 52d can be minimized.

In a configuration such as the one described above, the vertical synchronization signal DV sync and the vertical synchronization signal SVsync can be synchronized by any of various methods, but regardless of the method by which synchronization is carried out, if the vertical synchronization period fluctuates in accordance with the power mode, etc., the timing of the end of the data generation process may fluctuate on an individual line basis in association with fluctuation of the vertical synchronization period in question. Consequently, the magnitude of the delay between the timing corresponding with image capture of a subject by the image sensor 15 and timing corresponding to display of an image of the subject by the liquid crystal panel 42 may fluctuate. Accordingly, by displaying an index that corresponds to the delay in question on the index display section, it is possible for the user to ascertain the extent of the delay in the display section 40.

Further, in addition to the embodiment discussed previously, various other modes may be contemplated as configurations in which the frame rate or the magnitude of the delay between the timing corresponding with image capture of a subject by the area image sensor 15 and timing corresponding to display of an image of the subject by the liquid crystal panel 42 may fluctuate. For example, in a configuration whereby the size of the subject image display region R1 and of the information display region R2 in the liquid crystal panel 42 of the display section 40 are modifiable, if the vertical synchronization period or the horizontal synchronization period fluctuates in association with fluctuation of the size of the regions in question, the frame rate or the magnitude of the delay between the timing corresponding with image capture of a subject by the area image sensor 15 and timing corresponding to display of an image of the subject by the liquid crystal panel 42 may fluctuate as well. Accordingly, there may be adopted a configuration whereby an index in accordance with fluctuation in the size of the subject image display region R1 and of the information display region R2 is displayed on the index display section. The subject image display region R1 and of the information display region R2 may be of any desired size, including instances in which either size is zero.

In the embodiment described above, the index fluctuates in accordance with modes of a single class, with a one-to-one correspondence between the modes and the index; however, configurations in which a resultant index of a combination of a plurality of modes is determined are also possible. For example, there may be contemplated a configuration in which the frame rate is switched by a combination of sports image capture mode and power saving mode. Specifically, even with a configuration whereby ON/OFF switching of the sports image capture mode and ON/OFF switching of the power save mode are possible, with the frame rate being smaller when the power saving mode is ON and the frame rate being greater when the power saving mode is OFF (non-power saving mode), there may be contemplated a case in which, where the sports image capture mode is ON, the frame rate is not lowered despite the power saving mode being ON, so as to make possible display updating at high speed. In such a case, the frame rate is determined by the combination of the sports image capture mode and the power saving mode, and an index in accordance with the frame rate so determined is displayed on a specified index display section. In this configuration, because larger numbers of mode combinations make it more difficult for the user to intuitively estimate the magnitude of the delay from mode switching, user convenience is enhanced through clear indication of the delay afforded by the index.

Further, whereas in the embodiment described above the cycles of the vertical synchronization signal SVsync of the area image sensor 15 and the vertical synchronization signal DVsync of the liquid crystal panel 42 are the same and constant, the present invention may also be implemented in configurations in which the vertical synchronization signal SVsync and the vertical synchronization signal DVsync are not synchronized. In such configurations, there may be adopted a configuration in which, in instances where the magnitude of delay between timing corresponding with image capture of a subject by the area image sensor 15 and timing corresponding to display of an image of the subject by the liquid crystal panel 42 fluctuates in accordance with the mode, etc., an index in accordance with the mode is displayed. By making the vertical synchronization signals SVsync, DVsync asynchronous, provided that the magnitude of the delay fluctuates dynamically, an index that corresponds to delay may be displayed dynamically on an individual frame basis, or a configuration in which the index is updated for individual sets of several frames may be adopted.

The magnitude of the delay may fluctuate dynamically, and there may be cited as an example of such dynamic fluctuation one in which the delay fluctuates in accordance with the image capture environment, such as the lighting of the subject or speed of movement of the subject. More specifically, there may be contemplated a configuration in which the vertical synchronization period of the area image sensor 15 fluctuates in accordance with the necessity of adjusting exposure duration in accordance with the lighting of the subject. In other words, in the area image sensor 15, where the length of the exposure is determined in accordance with the quantity of received light, the magnitude of the delay in question may fluctuate such that the delay is greater for longer durations of exposure. Accordingly, an index may be predefined in accordance with the duration of exposure such that a greater delay is indicated when the duration of the exposure is a first duration than when the duration of the exposure is a second duration which is shorter than the first duration, and a configuration may be adopted whereby if the vertical synchronization period of the area image sensor 15 fluctuates due to the length of duration of the exposure, the fluctuation is detected by the CPU 50. The CPU 50 then calculates the delay duration in accordance with the fluctuation of the vertical synchronization period in question; based on the calculated delay duration, specifies an index to be displayed; and generates OSD data which is recorded to the VRAM 51. According to this configuration, an index in accordance with the length of duration of the exposure is displayed on the liquid crystal panel 42 of the display section 40.

Further, in the preceding embodiment, the magnitude of the delay was specified in accordance with modes which are switched through operation of the operation section 55, but configurations in which an index is specified by some other cause are also acceptable. For example, there may be contemplated a configuration whereby the vertical synchronization period or the horizontal synchronization period in the display section is modified in accordance with the remaining amount of electricity of the battery for driving the image-capturing device. Specifically, it is possible to adopt a configuration whereby the power mode is switched in accordance with the remaining amount of electricity of the battery. This arrangement is realized by having the CPU 50 detect the remaining amount of electricity of the battery, and switching the power mode in accordance with the remaining amount of electricity of the battery detected by the CPU 50. The CPU 50 then specifies a delay in accordance with the power mode in question, specifies the index that corresponds to the delay in question, and generates OSD data-including the index in question, which is recorded to the VRAM 51. The index may be defined in such a way as to indicate a greater delay when the remaining amount of electricity of the battery is a first amount of electricity than when the remaining amount of electricity of the battery is a second amount of electricity which is greater than the first amount of electricity, and there may be adopted a configuration whereby OSD data which includes an index in accordance with the remaining amount of electricity of the battery is generated and recorded in the VRAM 51. According to a configuration such as the above, an index in accordance with the remaining amount of electricity of the battery is displayed on the liquid crystal panel 42 of the display section 40. Also, an index may be displayed through measurement of the actual delay. Specifically, it is possible to measure the actual duration between a timing relating to image capture, such as the timing at which the vertical synchronization signal SVsync was supplied, and a timing relating to display, such as the timing when all image processing likely to give rise to delay has ended. The timing at which all image processing likely to give rise to delay has ended is acquired based on progress information. Alternatively, the duration until progress information is acquired may be measured. An index in accordance with this duration is then displayed on the liquid crystal panel 42 of the display section 40. Particularly in the case of display based on actual measurement in this fashion, it is conceivable that the delay duration of a frame being displayed may not be displayed in time. In anticipation of such instances, the delay duration of a frame that precedes by one frame or several frames the frame being displayed may be displayed instead. Also, the index may be updated each time that a prescribed duration (or a prescribed number of frames) has passed. Because the likelihood of the delay duration changing suddenly while image capture is continuing is low, the effect on the user of carrying out display in this fashion is considered minimal.

Furthermore, the display section 40 is an EVF which uses a liquid crystal panel in the embodiment described above, but the display section 40 may be a display section other than an EVF. For example, the display section 40 may be a display section which uses a liquid crystal panel attached to a back surface of the image-capturing device 1, or a display section other than a liquid crystal panel may be used. The image-capturing device 1 may also be a single-lens reflex camera provided with a mirror, the image-capturing device 1 may be a movie camera, or the image-capturing device 1 may be a mobile telephone or other device provided with image-capturing functionality. The color filters are also in a Bayer array in the area image sensor 15 described above, but the present invention may also be applied in an image-capturing device which utilizes a sensor configured in an arrangement other than a Bayer array. The line buffer 52d may be a line buffer, but may also be a VRAM provided with a recording capacity for recording the image data of a single frame. Through this configuration, various types of processing can be performed based on the image data to be displayed. The horizontal synchronization period is also preferably lengthened with respect to a reference period, and various types of periods can be assumed as the reference period. For example, the cycle of the horizontal synchronization signal SHsync of the area image sensor 15, the cycle for generating the image data, and other cycles may be used as the reference period. Furthermore, various forms may be adopted as the form in which various types of signals are transmitted from the timing generator 30 to the display section 40, and signals may be transmitted by HDMI (high-definition multimedia interface) and other methods. The directions in the embodiment described above may also be reversed. In the horizontal direction, for example, display may be performed from left to right or from right to left.

Furthermore, the OSD data are preferably image data indicating predetermined information to be displayed in the information display region of the display section, and a configuration may be adopted in which the predetermined information to be displayed includes various types of information other than that of image-capturing conditions, e.g., information indicating the remaining amount of power in a battery mounted in the image-capturing device 1, or other information.

Various configurations other than the configuration described above may also be employed as the configuration for making the cycles of the vertical synchronization signals SVsync, DVsync the same and constant. For example, a configuration may be adopted in which, after display in the subject image display region R1 is performed, the smallest period that can be set for displaying the OSD data in the information display region R2 is used as the horizontal synchronization period in the information display region R2, whereby display of all the lines of the liquid crystal panel 42 is completed before the output timing of the vertical synchronization signal DVsync, and the vertical synchronization signal DVsync is outputted at a prescribed output timing after waiting for the remainder of the period.

Further, whereas in the embodiment described above there is employed a configuration whereby the image of the subject captured by the area image sensor 15 is displayed on the liquid crystal panel 42, it is possible to adopt a configuration for displaying information similar to the index described above in an alternative configuration. For example, in a configuration of the image-capturing device 1 whereby captured images that have been recorded to a removable memory or the like are displayed on the liquid crystal panel 42, if the frame rate is modifiable during display, an index corresponding to the frame rate in question may be displayed.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image-displaying device adapted to display in a display section an image of a subject based on image data generated based on output data from an area image sensor that captures the image of the subject, the image-displaying device comprising:
   a display control section configured to generate signals for prescribing frame rates of the area image sensor and the display section;
   an index display control section configured to generate an index corresponding to a duration of a delay between a timing of a start of image-capture of the subject by the area image sensor and a timing that display of an image of the subject in the display section begins; and
   an image data generation section configured to generate the image data to display the image of the subject in an image display region of the display section and to display the index in an index display region of the display section,
   the duration of the delay being determined based on the frame rates of the area image sensor and the display section.

2. The image-displaying device according to claim 1, wherein
   the display control section is configured to display images of the subject at different frame rates in the display section, and
   the index display control section is configured to display, as the index, a current frame rate in the display section.

3. The image-displaying device according to claim 1, wherein
   the display control section is configured to modify a quantity of images displayed per unit time in the display section in accordance with an operation of an operating section by the user, and
   when the quantity of images displayed per unit time is a first quantity, the index display control section is configured to display in the index display section the index indicating that the delay is greater than when the quantity of images displayed per unit time is a second quantity that is greater than the first quantity.

4. The image-displaying device according to claim 1, wherein
   the index display control section is configured to display in the index display section the index in accordance with image capture environment outputted by the area image sensor.

5. The image-displaying device according to claim 4, wherein
   the index display control section is configured to display in the index display section the index in accordance with a duration of exposure carried out by the area image sensor, the duration of exposure being determined in accordance with an amount of received light of the area image sensor when the image is captured.

6. The image-displaying device according to claim 5, wherein
   when the duration of exposure is a first duration, the index display control section is configured to display in the index display section the index indicating that the delay is greater than when the duration of exposure is a second duration that is shorter than the first duration.

7. The image-displaying device according to claim 1, wherein
   the display control section is configured to modify a quantity of images displayed per unit time in the display section in accordance with a remaining amount of electricity of a battery for driving the image-displaying device, and
   when the remaining amount of electricity of the battery is a first amount of electricity, the index display control section is configured to display in the index display section the index indicating that the delay is greater than when the remaining amount of electricity of the battery is a second amount of electricity that is greater than the first amount of electricity.

8. An image-displaying device adapted to display in a display section an image of a subject based on image data generated based on output data from an area image sensor that captures the image of the subject, the image-displaying device comprising:
   a timing generator configured to generate signals for prescribing frame rates of the area image sensor and the display section;
   a central processing unit configured to generate an index corresponding to a duration of a delay between a timing of a start of image-capture of the subject by the area image sensor and a timing that display of an image of the subject in the display section begins; and an application-specific integrated circuit configured to generate the image data to display the image of the subject in an image display region of the display section and to display the index in an index display region of the display section, the duration of the delay being determined based on the frame rates of the area image sensor and the display section.

* * * * *